United States Patent
Chen et al.

(10) Patent No.: US 11,381,890 B1
(45) Date of Patent: Jul. 5, 2022

(54) MULTIPORT WAVEGUIDE DEVICE

(71) Applicant: Hughes Network Systems, LLC, Germantown, MD (US)

(72) Inventors: Guo Chen, Damascus, MD (US); Ed Lott, Frederick, MD (US); Ryan Free, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 0 days.

(21) Appl. No.: 17/138,364

(22) Filed: Dec. 30, 2020

(51) Int. Cl.
*H01P 1/161* (2006.01)
*H04Q 11/00* (2006.01)
*H04J 14/06* (2006.01)

(52) U.S. Cl.
CPC ......... *H04Q 11/0005* (2013.01); *H01P 1/161* (2013.01); *H04J 14/06* (2013.01); *H04Q 2011/0035* (2013.01)

(58) Field of Classification Search
CPC ....................................... H01P 1/161
See application file for complete search history.

(56) References Cited

U.S. PATENT DOCUMENTS

| | | | |
|---|---|---|---|
| 2010/0285758 A1* | 11/2010 | Laidig | H01Q 23/00 455/90.3 |
| 2016/0119018 A1* | 4/2016 | Lindgren | H04B 1/52 375/219 |

OTHER PUBLICATIONS

Leal-Sevillano et al., A Micromachined Dual-Band Orthomode Transducer, IEEE Transactions on Microwave Theory and Techniques, vol. 62, No. 1, Jan. 2014 (Year: 2014).*

* cited by examiner

*Primary Examiner* — Shi K Li
(74) *Attorney, Agent, or Firm* — Global IP Counselors, LLP

(57) ABSTRACT

A multiport waveguide device is disclosed herein. In an embodiment, a multiport waveguide device includes a first receiving port structure configured to guide a first incoming RF signal, a second receiving port structure configured to guide a second incoming RF signal, a first transmitting port structure configured to guide a first outgoing RF signal, and a second transmitting port structure configured to guide a second outgoing RF signal. The multiport waveguide device also includes common port structure configured to simultaneously guide the first incoming RF signal, the second incoming RF signal, the first outgoing RF signal, and the second outgoing RF signal through a common port.

20 Claims, 5 Drawing Sheets

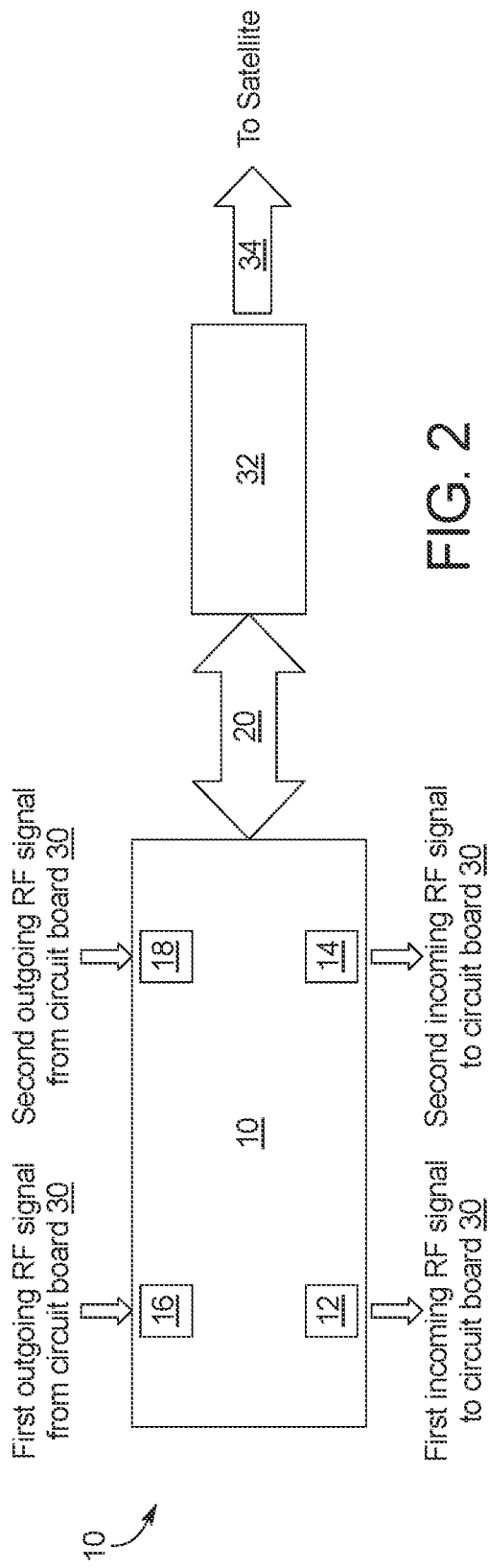
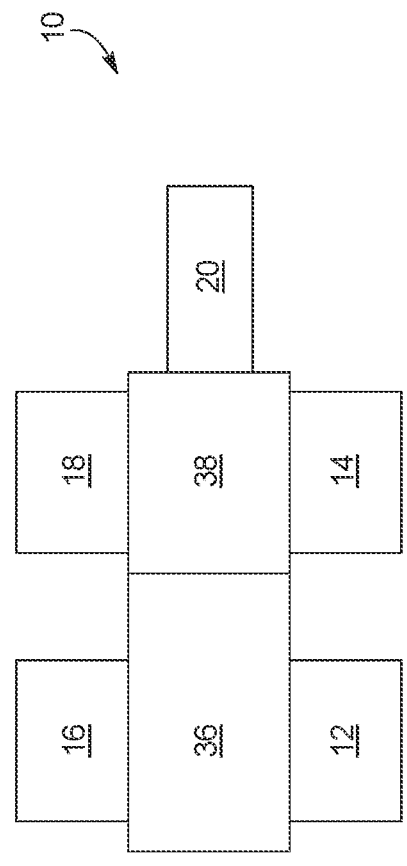
FIG. 2
FIG. 3

MULTIPORT WAVEGUIDE DEVICE

BACKGROUND

Field of the Invention

The present disclosure generally relates to a multiport waveguide device. In particular, the present disclosure relates to a multiport waveguide device having multiple receiving ports and/or multiple transmitting ports for the simultaneous reception and/or transmission of radio frequency ("RF") signals.

Background Information

Various waveguide devices are capable of receiving or transmitting RF signals. Conventional waveguide devices can be a hollow conductive metal pipe used to carry high frequency radio waves, particularly microwaves. The geometry of a waveguide reflects its function; in addition to more common types that channel the wave in one dimension, there are two-dimensional slab waveguides which confine waves to two dimensions.

SUMMARY

It has been determined that existing conventional assemblies are costly and not suited for mass production. Existing assemblies also typically require electromechanical switching between multiple ports. Existing assemblies are also typically large and bulky, experience waveguide insertion losses, and/or do not allow a single circuit board to be used for all of the receiving and transmitting ports.

The present disclosure provides a multiport waveguide device enabled for the simultaneous reception of multiple incoming RF signals and/or the simultaneous transmission of multiple outgoing RF signals. More specifically, the multiport waveguide device of the present disclosure employs an orthogonal mode transducer (OMT) to integrate two orthogonal polarization signals (one is transmitting and the other is receiving) for the same antenna. The multiport waveguide device can be a 5-port OMT with dual polarization and dual diplexer integration, allowing a radio terminal to take advantage of two orthogonal polarization receiving signals (at the same bandwidth, at the same time), and transmitting one or two orthogonal signals at the same bandwidth to a satellite. The multiport waveguide device further uses a 90 degree waveguide twist to transfer both the receiving orthogonal mode and the transmitting orthogonal mode to be horizontal modes (e.g., transfer an E-plane split to an H-plane split, or vice versa, for high yield split manufacturing), with a minimum E-plane split area, boosting the robustness and consistency of RF performance after assembly. With the disclosed multiport waveguide device, the integration of a transmitting electronic circuit and a receiving electronic circuit can implemented on the same circuit board, minimizing the overall size and reducing production cost. Thus, the multiport waveguide device described herein has a compact design, is simple and inexpensive to construct, achieves high tolerances, does not require electromechanical switching, and enables a single circuit board to be used for all of the receiving and transmitting ports. This structure also enables wide band radio design with low insertion loss.

In view of the state of the known technology, one aspect of the present disclosure is to provide a multiport waveguide device including a first receiving port structure, a second receiving port structure, a first transmitting port structure, a second transmitting port structure, and a common port structure. The first receiving port structure includes a first receiving port configured to be placed adjacent to a circuit board. The first receiving port structure is configured to guide a first incoming RF signal to the circuit board. The second receiving port structure includes a second receiving port configured to be placed adjacent to the circuit board. The second receiving port structure is configured to guide a second incoming RF signal to the circuit board. The first transmitting port structure includes a first transmitting port configured to be placed adjacent to the circuit board. The first transmitting port structure is configured to guide a first outgoing RF signal transmitted from the circuit board. The second transmitting port structure includes a second transmitting port configured to be placed adjacent to the circuit board. The second transmitting port structure is configured to guide a second outgoing RF signal transmitted from the circuit board. The common port structure includes a common port that is in signal communication with each of the first receiving port, the second receiving port, the first transmitting port, and the second transmitting port. The common port structure is configured to simultaneously guide the first incoming RF signal, the second incoming RF signal, the first outgoing RF signal, and the second outgoing RF signal through the common port.

Another aspect of the present disclosure is to provide a multiport waveguide device including a first receiving port structure, a second receiving port structure, a first transmitting port structure, a second transmitting port structure, and a common port structure. The first receiving port structure includes a first receiving port. The first receiving port structure is configured to transmit a first incoming RF signal polarized in a first plane from the first receiving port to a circuit board. The second receiving port structure includes a second receiving port. The second receiving port structure is configured to change a second incoming RF signal from being polarized in a second plane to being polarized in the first plane before transmitting the second incoming RF signal from the second receiving port to the circuit board. The first transmitting port structure includes a first transmitting port. The first transmitting port structure is configured to receive a first outgoing RF signal polarized in the first plane from the circuit board into the first transmitting port. The second transmitting port structure includes a second transmitting port. The second transmitting port structure is configured to change a second outgoing RF signal from being polarized in the first plane to being polarized in the second plane after receiving the second outgoing RF signal from the circuit board into the second receiving port. The common port structure includes a common port that is in signal communication with each of the first receiving port, the second receiving port, the first transmitting port, and the second transmitting port. The common port structure is configured to guide the first incoming RF signal, the second incoming RF signal, the first outgoing RF signal, and the second outgoing RF signal through the common port.

Another aspect of the present disclosure is to provide a multiport waveguide device including a first port structure, a second port structure, and a common port structure. The first port structure includes a first port. The first port is configured to interface with a circuit board. The second port structure includes a second port. The second port is configured to interface with the circuit board. The common port structure includes a common port. The common port is configured to simultaneously guide a first RF signal and a second RF signal. The first port structure is configured to at least one of: (i) transmit the first RF signal polarized in a first plane from the first port to a circuit board, or (ii) receive the first RF signal polarized in the first plane from the circuit board into the first port. The second port structure is configured to at least one of: (i) change the second RF signal from being polarized in a second plane to being polarized in the first plane before transmitting the second RF signal from the second port to the circuit board, or (ii) change the second RF signal from being polarized in the first plane to being polarized in the second plane after receiving the second RF signal from the circuit board into the second port.

Also, other objects, features, aspects and advantages of the disclosed multiport waveguide device will become apparent to those skilled in the art in the field of RF signals from the following detailed description, which, taken in conjunction with the annexed drawings, discloses preferred embodiments of a multiport waveguide device with various features.

BRIEF DESCRIPTION OF THE DRAWINGS

Referring now to the attached drawings which form a part of this original disclosure:

FIG. 2 illustrates a schematic diagram of the multiport waveguide device of FIG. 1 interfacing with a polarizer;

FIG. 3 illustrates another schematic diagram of the multiport waveguide device of FIG. 1;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
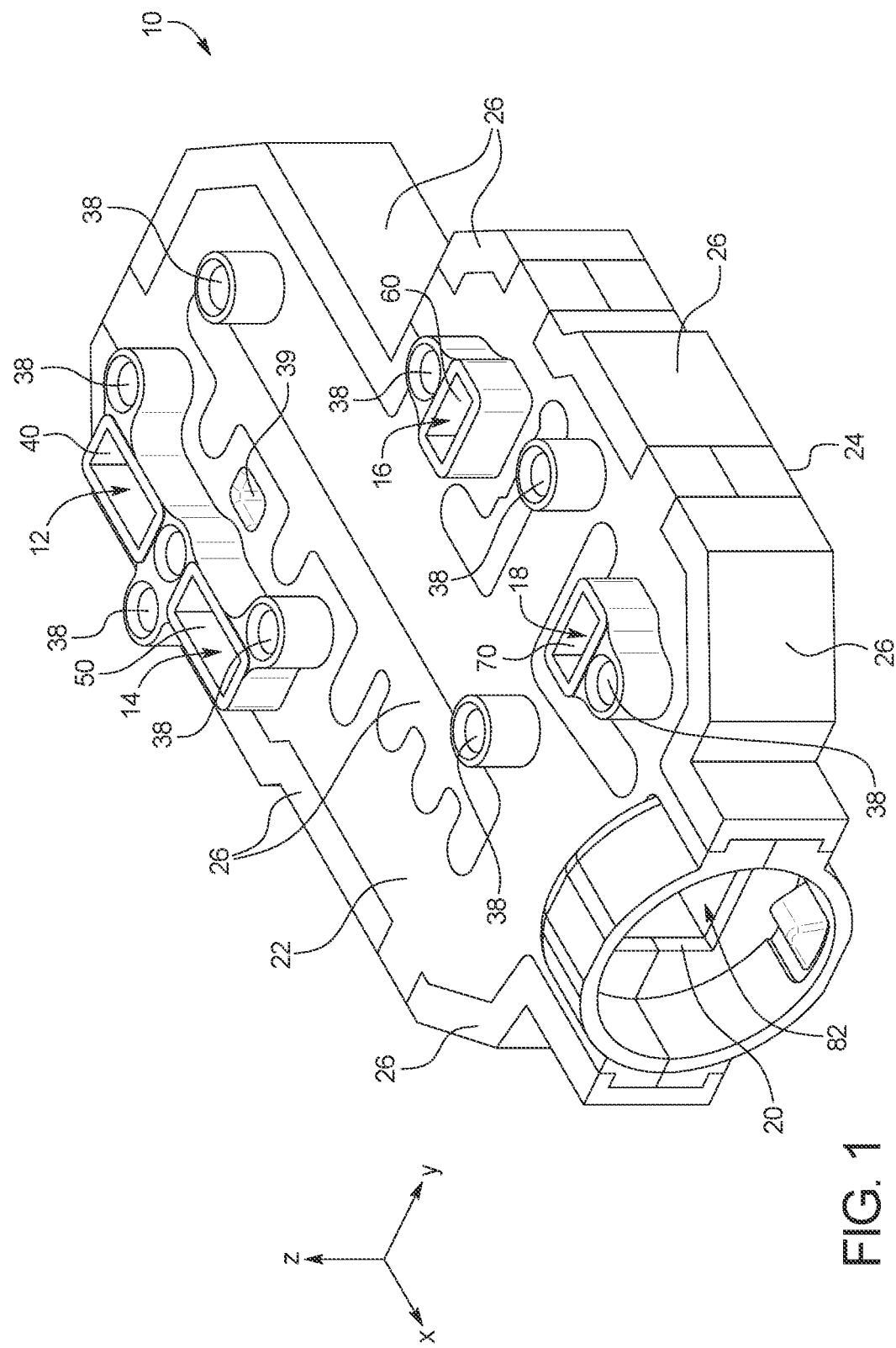
FIG. 1 illustrates a perspective view of a multiport waveguide device in accordance with the present disclosure, taken from a first side of the multiport waveguide device.

FIG. 1 illustrates an example embodiment of a multiport waveguide device 10 in accordance with the present disclosure. In the illustrated embodiment, the multiport waveguide device 10 includes a first receiving port structure 12, a second receiving port structure 14, a first transmitting port structure 16, a second transmitting port structure 18, and a common port structure 20. Thus, the multiport waveguide device 10 in the illustrated embodiment is a five-port device. It should be understood by those of ordinary skill in the art from this disclosure, however, that the multiport waveguide device 10 is not limited to five ports and can include more or less ports in accordance with the principles discussed herein. As described in more detail below, the multiport waveguide device 10 is configured to simultaneously receive and/or transmit radio frequency ("RF") signals using any one or more of its ports without the need for electromechanical switching.

The multiport waveguide device 10 includes a first portion 22 and a second portion 24. The first portion 22 is on a first side of the multiport waveguide device 10, and the second portion 24 is on an opposite second side of the multiport waveguide device 10. In FIG. 1, the first side is shown as the top side of the multiport waveguide device 10 in the z-direction, and the second side is shown as the bottom side of the multiport waveguide device 10 in the z-direction. It should be understood by those of ordinary skill in the art from this disclosure, however, that either part can be the "top" or "bottom" of the multiport waveguide device 10. In FIG. 1, the first receiving port structure 12, the second receiving port structure 14, the first transmitting port structure 16, and the second transmitting port structure 18 protrude upwardly from the first portion 22. The first portion 22 and the second portion 24 can each include a portion of the inner channels of one or more of the first receiving port structure 12, the second receiving port structure 14, the first transmitting port structure 16, and the second transmitting port structure 18, such that attaching the first portion 22 to the second portion 24 forms the channels (e.g., encloses the channels in the z-direction). The first portion 22 and the second portion 24 each also include a portion of the common port structure 20 (here, e.g., half), such that attaching the first portion 22 to the second portion 24 forms the common port structure 20. In the illustrated embodiment, the multiport waveguide device 10 further includes a third portion 26 to fix the first portion 22 to the second portion 24 during the manufacturing process. The third portion 26 can be injection molded onto the first portion 22 and the second portion 24 once the first portion 22 and the second portion 24 have been placed together and aligned.

Figure 4:
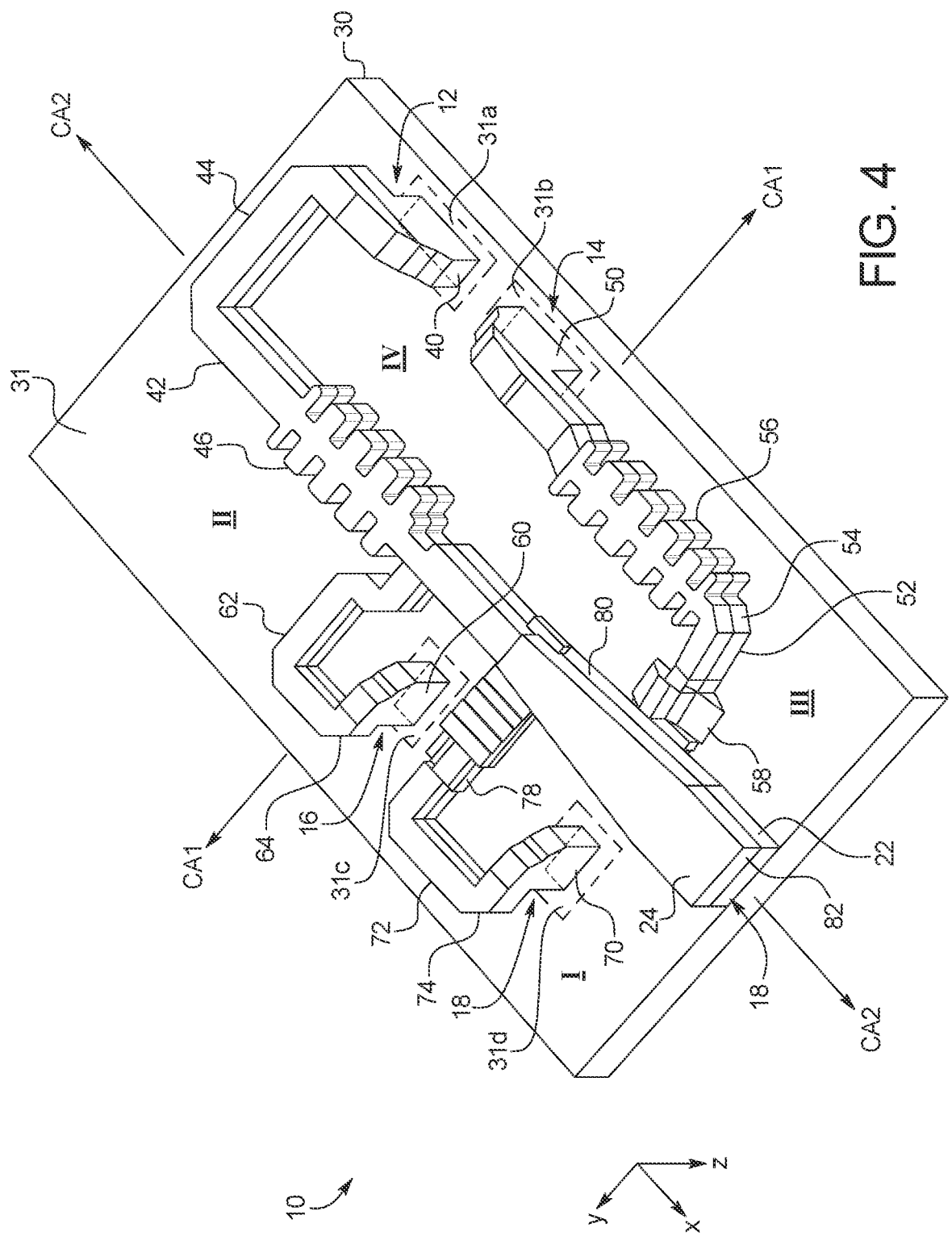
FIG. 4 illustrates a perspective view of a first part and a second part of the multiport waveguide device of FIG. 1, taken from a second side of the multiport waveguide device.

The multiport waveguide device 10 is configured to interface with a circuit board 30. More specifically, the multiport waveguide device 10 is configured to interface with a single circuit board 30. The circuit board 30 can be a printed circuit board. As seen in FIG. 4, the circuit board 30 is placed against the first portion 22 of the multiport waveguide device 10. The circuit board 30 is generally located at least partially along a plane. As used herein, the "circuit plane" refers to the plane that coincides with the circuit board 30. In the illustrated embodiment, the circuit plane is the horizontal (e.g., x-y) plane. The circuit plane can also be a vertical plane if the multiport waveguide device 10 is oriented orthogonally in comparison to what is shown. In FIG. 4, the circuit board 30 is below the first portion 22 in the horizontal x-y plane. In FIG. 1, although not shown, the circuit board 30 would be in the horizontal x-y plane and would be located below the first portion 22 of the multiport waveguide device 10 in the z-direction. More specifically, the circuit board 30 would be fixed against the first receiving port structure 12, the second receiving port structure 14, the first transmitting port structure 16, and the second transmitting port structure 18. Thus, each of the first receiving port structure 12, the second receiving port structure 14, the first transmitting port structure 16, and the second transmitting port structure 18 interface with the circuit board 30. As seen in FIG. 1, the multiport waveguide device 10 includes a plurality of fixing apparatuses 38 (here, e.g., screw holes) for fixing the circuit board 30 in the horizontal x-y plane against the first portion 22. The multiport waveguide device 10 also includes an alignment feature 39 for aligning the first portion 22 and the second portion 24. In an embodiment in accordance with the present disclosure, a terminal can include the multiport waveguide device 10 and the circuit board 30. The terminal can be, for example, a very small aperture terminal (VSAT), as discussed in more detail below.

As illustrated in FIG. 4, when the multiport waveguide device 10 is attached to the circuit board 30, the first receiving port structure 12, the second receiving port structure 14, the first transmitting port structure 16, and the second transmitting port structure 18 are each placed adjacent to a first surface 31 of the circuit board 30. More specifically, the first receiving port structure 12, the second receiving port structure 14, the first transmitting port structure 16, and the second transmitting port structure 18 are placed against the first surface 31 of the circuit board 30. Here, the first surface 31 is the outer surface (e.g., layer) of the circuit board 30. Thus, a single flat circuit board can be used with all of the first receiving port structure 12, the second receiving port structure 14, the first transmitting port structure 16, and the second transmitting port structure 18. The first receiving port structure 12 and the second receiving port structure 14 each guide a respective incoming RF signal to the circuit board 30, with the incoming RF signals linearly polarized in a first plane when received by the circuit board 30. The first transmitting port structure 16 and the second transmitting port structure 18 each receive a respective outgoing RF signal from the circuit board 30, with the outgoing RF signals also linearly polarized in the first plane when launched from the circuit board 30. The first plane is orthogonal to the circuit plane. The first plane can be, for example, a horizontal plane or a vertical plane. The first plane can be, for example, an E-plane or an H-plane. In the illustrated embodiment, the first plane is a vertical or H-plane which is orthogonal to the horizontal circuit plane.

When the multiport waveguide device 10 is attached to the circuit board 30, the first receiving port structure 12 aligns with a first receiving portion 31a of the circuit board 30 (see FIG. 4). The first receiving port structure 12 is in signal communication with the common port structure 20. Thus, the first receiving port structure 12 places the first receiving portion 31a in signal communication with the common port structure 20. As used herein, "signal communication" means that an RF signal can be communicated between elements. The first receiving port structure 12 is configured to guide a first incoming RF signal towards the circuit board 30. An example of the signal path of the first incoming RF signal is labeled as $I_1$ in FIG. 5. The first receiving port structure 12 guides the first incoming RF signal from the common port structure 20 towards the circuit board 30. The first receiving port structure 12 delivers the first incoming RF signal to the first receiving portion 31a of the circuit board 30. Thus, the circuit board 30 receives the first incoming RF signal from the first receiving port structure 12 at the first receiving portion 31a. The first incoming RF signal is a linearly polarized wave. Here, the first incoming RF signal is linearly polarized in the first plane when received by the first receiving port structure 12 from the common port structure 20. The first incoming RF signal is also linearly polarized in the first plane when received by the first receiving portion 31a of the circuit board 30 from the first receiving port structure 12. Thus, first incoming RF signal is linearly polarized in the first plane throughout the first receiving port structure 12. For example, in the illustrated embodiment, the first incoming RF signal is polarized in a vertical or H-plane throughout the first receiving port structure 12. The first incoming RF signal is also polarized in the first plane when received at the common port structure 20 before transmission to the first receiving port structure 12.

When the multiport waveguide device 10 is attached to the circuit board 30, the second receiving port structure 14 aligns with a second receiving portion 31b of the circuit board 30 (see FIG. 4). The second receiving port structure 14 is in signal communication with the common port structure 20. Thus, the second receiving port structure 14 places the second receiving portion 31b in signal communication with the common port structure 20. The second receiving port structure 14 is configured to guide a second incoming RF signal towards the circuit board 30. An example of the signal path of the second incoming RF signal is labeled as $I_2$ in FIG. 5. The second receiving port structure 14 guides the second incoming RF signal from the common port structure 20 towards the circuit board 30. The second receiving port structure 14 delivers the second incoming RF signal to the second receiving portion 31b of the circuit board 30. Thus, the circuit board 30 receives the second incoming RF signal from the second receiving port structure 14 at the second receiving portion 31b. The second incoming RF signal is a linearly polarized wave. The second incoming RF signal is linearly polarized in the first plane when received by the second receiving portion 31 of the circuit board 30 from the second receiving port structure 14. However, the second incoming RF signal is linearly polarized in a second plane when received by the second receiving port structure 14 from the common port structure 20. Thus, as explained in more detail below, the second receiving port structure 14 changes the polarization of the second incoming RF signal from the second plane to the first plane when guiding the second incoming RF signal toward the circuit board 30. The second plane can be orthogonal to the first plane. The second plane can be, for example, a horizontal plane or a vertical plane. For example, the first plane can be one of a horizontal or vertical plane, and the second plane can be the other of the horizontal or vertical plane. The second plane can be, for example, an E-plane or an H-plane. For example, the first plane can be one of an E-plane or an H-plane, and the second plane can be the other of the E-plane or an H-plane. In the illustrated embodiment, the second plane is a horizontal or E-plane. Thus, the second incoming RF signal is polarized in a horizontal or E-plane when transmitted to the second receiving port structure 14 from the common port structure 20, and is polarized in a vertical or H-plane when transmitted from the second receiving port structure 14 to the circuit board 30.

When the multiport waveguide device 10 is attached to the circuit board 30, the first transmitting port structure 16 aligns with a first transmitting portion 31c of the circuit board 30 (see FIG. 4). The first transmitting port structure 16 is in signal communication with the common port structure 20. Thus, the first transmitting port structure 16 places the first transmitting portion 31c in signal communication with the common port structure 20. The first transmitting port structure 16 is configured to guide a first outgoing RF signal away from the circuit board 30. An example of the signal path of the first outgoing RF signal is labeled as $O_1$ in FIG. 5. The first transmitting port structure 16 guides the first outgoing RF signal from the circuit board 30 towards the common port structure 20. The first transmitting port structure 16 receives the first outgoing RF signal from the first transmitting portion 31c of the circuit board 30. That is, the circuit board 30 launches the first outgoing RF signal into the first transmitting port structure 16 at the first transmitting portion 31c. The first outgoing RF signal is a linearly polarized wave. Here, the first outgoing RF signal is linearly polarized in the first plane when launched from the first transmitting portion 31c of the circuit board 30 into the first transmitting port structure 16. The first outgoing RF signal is also linearly polarized in the first plane when transmitted to the common port structure 20 from the first transmitting port structure 16. Thus, first outgoing RF signal is linearly polarized in the first plane throughout the first transmitting port structure 16. For example, in the illustrated embodiment, the first outgoing RF signal is polarized in a vertical or H-plane throughout the first transmitting port structure 16. The first outgoing RF signal is also polarized in the first plane when output from the common port structure 20.

When the multiport waveguide device 10 is attached to the circuit board 30, the second transmitting port structure 18 aligns with a second transmitting portion 31*d* of the circuit board 30 (see FIG. 4). The second transmitting port structure 18 is in signal communication with the common port structure 20. Thus, the second transmitting port structure 16 places the second transmitting portion 31*d* in signal communication with the common port structure 20. The second transmitting port structure 18 is configured to guide a second outgoing RF signal away from the circuit board 30. An example of the signal path of the second outgoing RF signal is labeled as $O_2$ in FIG. 5. The second transmitting port structure 18 guides the second outgoing RF signal from the circuit board 30 towards the common port structure 20. The second transmitting port structure 18 receives the second outgoing RF signal from the second transmitting portion 31*d* of the circuit board 30. That is, the circuit board 30 launches the second outgoing RF signal to the second transmitting port structure 18 at the second transmitting portion 31*d*. The second outgoing RF signal is a linearly polarized wave. The second outgoing RF signal is linearly polarized in the first plane when received by the second transmitting port structure 18 from the second transmitting portion 31*d* of the circuit board 30. However, the second outgoing RF signal is linearly polarized in a second plane when received by the common port structure 20 from the second transmitting port structure 18. Thus, as explained in more detail below, the second transmitting port structure 18 changes the polarization of the second outgoing RF signal from the first plane to the second plane when guiding the second outgoing RF signal toward the circuit board 30. As discussed above, the second plane can be orthogonal to the first plane. The second plane can be, for example, a horizontal plane or a vertical plane. For example, the first plane can be one of a horizontal or vertical plane, and the second plane can be the other of the horizontal or vertical plane. The second plane can be, for example, an E-plane or an H-plane. For example, the first plane can be one of an E-plane or an H-plane, and the second plane can be the other of the E-plane or the H-plane. In the illustrated embodiment, the second plane is a horizontal or E-plane. Thus, the second outgoing RF signal is polarized in a vertical or H-plane when launched from the circuit board 30 into the second transmitting port structure 18, and is polarized in a horizontal or E-plane when transmitted to the common port structure 20 from the second transmitting port structure 18.

Thus, in the illustrated embodiment, one of the first receiving port structure 12 and the second receiving port structure 14 is configured to change the polarization of one of the first incoming RF signal and the second incoming RF signal to a different plane. Here, the second receiving port structure 14 is configured to change the polarization of the second incoming RF signal to a different plane. The polarization of the second incoming RF signal can be twisted, for example, from a horizontal plane to a vertical plane, or vice versa. The polarization of the second incoming RF signal can be twisted, for example, from an E-plane to an H plane, or vice versa. Here, the first receiving port structure 12 does not change a linear polarization of the first incoming RF signal, while the second receiving port structure 14 changes the linear polarization of the second incoming RF signal. This allows both the first incoming RF signal and the second incoming RF signal to be simultaneously guided through the common port 20. Thus, in the illustrated embodiment, the first receiving port structure 12 operates as a co-pole receiver port, and the second receiving port structure 14 operates as a cross-pole receiver port. By operating in this manner, the multiport waveguide device 10 can receive the first incoming RF signal and the second incoming RF signal simultaneously, without requiring electromechanical switching.

Likewise, in the illustrated embodiment, one of the first transmitting port structure 16 and the second transmitting port structure 18 is configured to change the polarization of one of the first outgoing RF signal and the second outgoing RF signal to a different plane. Here, the second transmitting port structure 18 is configured to change the polarization of the second outgoing RF signal to a different plane. The polarization of the second outgoing RF signal can be twisted, for example, from a vertical plane to a horizontal plane, or vice versa. The polarization of the second outgoing RF signal can be twisted, for example, from an H-plane to an E-plane, or vice versa. Here, the first transmitting port structure 16 does not change a linear polarization of the first outgoing RF signal, while the second transmitting port structure 18 changes the linear polarization of the second outgoing RF signal. This enables both the first outgoing RF signal and the second outgoing RF signal to be simultaneously guided through the common port 20. Thus, in the illustrated embodiment, the first transmitting port structure 16 operates as a co-pole transmitter port, and the second transmitting port structure 18 operates as a cross-pole transmitter port. By operating in this manner, the multiport waveguide device 10 can transmit the first outgoing RF signal and the second outgoing RF signal simultaneously, without requiring electromechanical switching.

The common port structure 20 is configured for signal communication with each of the first receiving port structure 12, the second receiving port structure 14, the first transmitting port structure 16, and the second transmitting port structure 18. Thus, the common port structure 20 is configured for signal communication with each of the first receiving portion 31*a*, the second receiving portion 31*b*, the first transmitting portion 31*c*, and the second transmitting portion 31*d*. The common port structure 20 receives the first and second incoming RF signals into the multiport waveguide device 10 and transmits the first and second outgoing RF signals from the multiport waveguide device 10. As seen in FIG. 2, the common port structure 20 can be configured to interface with a polarizer 32. The polarizer 32 can be placed in communication with the common port structure 20, for example, by aligning the polarizer 32 with the common port structure 20. The polarizer 32 can be placed directly against the common port structure 20, or can be placed in signal communication with the common port structure 20 via one or more intermediate element. Here, the polarizer 32 is a linear-to-circular polarizer. A linear-to-circular polarizer is configured to convert linearly polarized waveforms into circularly polarized waveforms. Thus, in an embodiment, a terminal in accordance with the present disclosure includes the multiport waveguide device 10 and the polarizer 32. As seen in FIG. 2, the polarizer 32 can further be placed in communication with a port (e.g., a horn port) and/or antenna 34 that can communicate signals, for example, to a satellite. The port or antenna 34 can receive or transmit circularly polarized waveforms from the terminal (e.g., VSAT).

Thus, in an embodiment, a terminal (e.g., VSAT) in accordance with the present disclosure includes the multiport waveguide device 10, the circuit board 30, and the polarizer 32. Incoming circularly polarized RF signals can be converted to linearly polarized signals by the polarizer 32, guided through the common port structure 20, and guided to the circuit board 30 by one of the first receiving port structure 12 and the second receiving port structure 14. Likewise, linearly polarized outgoing RF signals can be guided from the circuit board 30 to the common port structure 20 via one of the first transmitting port structure 16 and the second transmitting port structure 18, guided to the polarizer 32 by the common port structure 20, and transmitted from the polarizer 32 after being converted to circularly polarized signals.

As seen in FIG. 3, the multiport waveguide device 10 can include at least one diplexer 36. The diplexer 36 can be a dual diplexer. The diplexer 36 can be configured to implement frequency-domain multiplexing with respect to any of the first receiving port structure 12, the second receiving port structure 14, the first transmitting port structure 16, and the second transmitting port structure 18. Here, the diplexer 36 frequency multiplexes the first receiving port structure 12 and the first transmitting port structure 16. A diplexer 36 can also be used to increase the number of port structures in accordance with the principles discussed herein. The type of diplexer 36 will vary depending on the intended frequencies of the incoming and outgoing RF signals. Other embodiments of the multiport waveguide device 10 can include triplexers, quadplexers, etc. The diplexer 36 can be part of the common port structure 20 or attached to the common port structure 20.

As seen in FIG. 3, the multiport waveguide device 10 includes a transducer 38. Here, the transducer 38 is an orthogonal mode transducer (OMT) 38. The OMT 38 is configured to combine and separate orthogonally polarized signal paths. The OMT 38 can have a dual polarization. The OMT 38 can be used to separate equal frequency signals. For example, the first incoming RF signal and the second incoming RF signal can have the same frequency. Likewise, the first outgoing RF signal and the second outgoing RF signal can have the same frequency. Since multiple RF signals are passing through the common port structure 20 in the same plane (e.g., incoming and outgoing RF signals in the same horizontal and vertical plane), the OMT 38 can enable the ports 12, 14, 16, 18 to guide the RF signals simultaneously. The type of OMT 38 will vary depending on the intended frequencies of the incoming and outgoing RF signals. The OMT 38 can be part of the common port structure 20 or attached to the common port structure 20.

Figure 5:
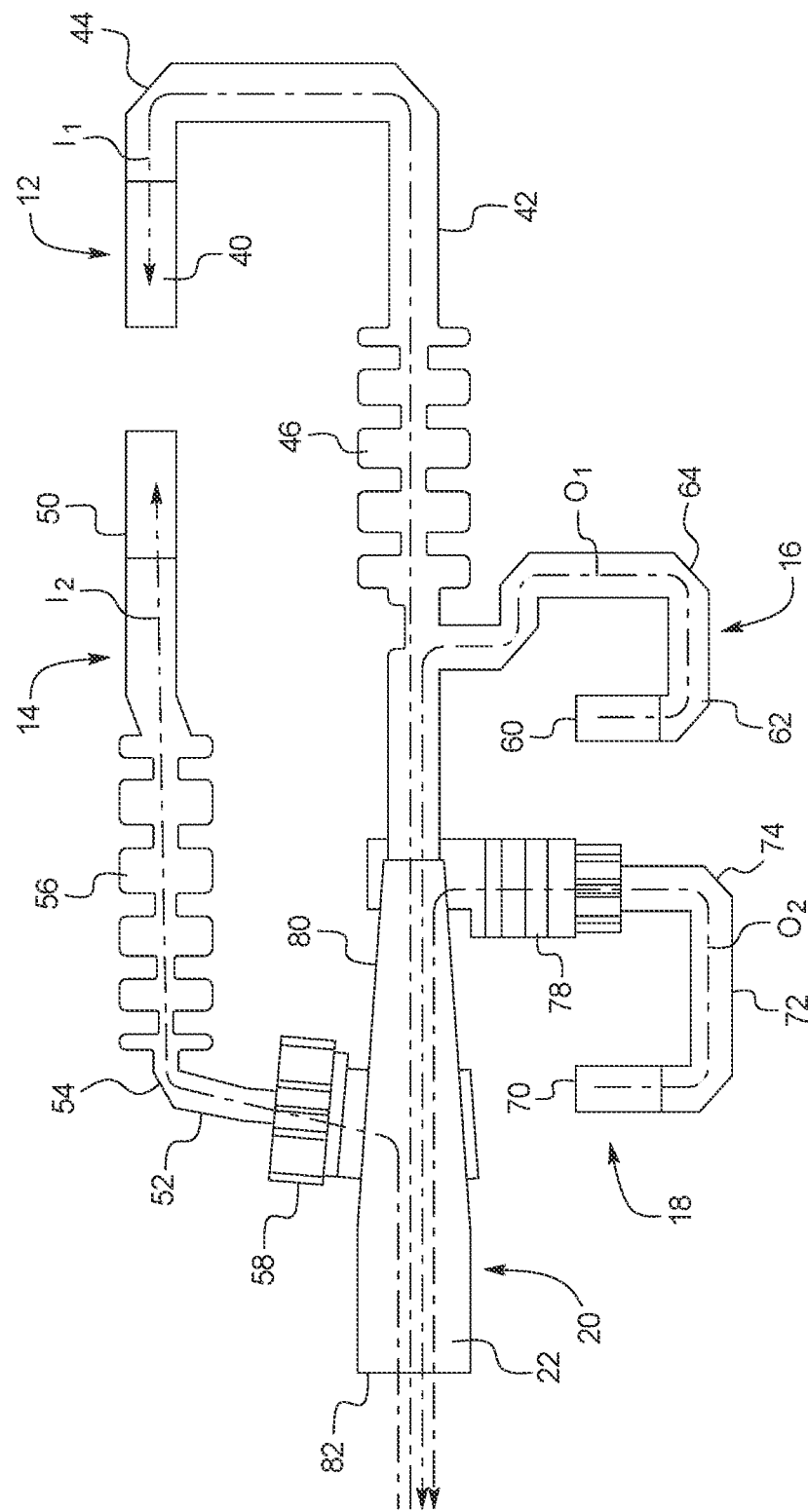
FIG. 5 illustrates a side view of a first part and a second part of the multiport waveguide device of FIG. 1, taken from the first side of the multiport waveguide device.

FIGS. 4 and 5 show the inner components of the multiport waveguide device 10 in more detail. FIG. 4 shows the inner components of the multiport waveguide device 10 from the perspective of the second side 24, with the first portion 22 positioned against the first surface 31 of the circuit board 30. FIG. 5 shows the inner components of the multiport waveguide device 10 from the perspective of the first portion 22, without the circuit board 30 shown.

In FIG. 4, the circuit board 30 is shown divided by a first central axis CA1 and a second central axis CA2. The first central axis CA1 divides the length of the circuit board 30 along the x-axis into two equal portions. The second central axis CA2 divides the width of the circuit board 30 along the y-axis into two equal portions. Thus, the first central axis CA1 and the second central axis CA2 form a first quadrant I, a second quadrant II, a third quadrant III, and a fourth quadrant IV on the first surface 31 of the circuit board 30. The first quadrant I and the third quadrant III are on opposite sides of the first central axis CA1 from the second quadrant II and the fourth quadrant IV. The first quadrant I and the second quadrant II are on opposite sides of the second central axis CA2 from the third quadrant III and the fourth quadrant IV. The first receiving portion 31a and the second receiving portion 31b are located in the fourth quadrant IV, while the first transmitting portion 31c and the second transmitting portion 31d are located in the first quadrant I, which is on the opposite side of both the first central axis CA1 and the second central axis CA2. This configuration is advantageous for operation of the multiport waveguide device 10 because it separates the transmitting and receiving ports to opposite corners of the circuit board 30. It should be understood by those of ordinary skill in the art from this disclosure, however, that the precise locations of the first receiving portion 31a, the second receiving portion 31b, the first transmitting portion 31c, and the second transmitting portion 31d can vary in alternative embodiments.

In the illustrated embodiment, the first receiving port structure 12 includes a first receiving port 40 and a first receiving channel 42. The first receiving port 40 is placed adjacent to (e.g., against) the circuit board 30 at the first receiving portion 31a. The first receiving port 40 includes an aperture allowing transmission of the first incoming RF signal to the circuit board 30 at the first receiving portion 31a. The first incoming RF signal is polarized in the first plane when transmitted through the first receiving port 40 to the first receiving portion 31a. Here, the first receiving port 40 is a vertical port. The first receiving port 40 can be, for example, a WR42 17.3-21.2 GHz port. The first receiving channel 42 places the first receiving port 40 in signal communication with the common port structure 20, thus guiding the first incoming RF signal from the common port structure 20 to the first receiving port 40. The first receiving channel 42 includes one or more bent section 44 and a band pass filter section 46. The bent sections 44 allow the first receiving port structure 12 to curve around and be placed at an advantageous position on the circuit board 30 (here, in the fourth quadrant IV). The band pass filter section 46 ensures that the first incoming RF signal has a desired frequency. The band pass filter section 46 is sized and shaped to allow RF signals at some frequencies to pass, while rejecting RF signals at other frequencies. The size, shape and position of the first receiving port 40 and the first receiving channel 42 can vary with different embodiments depending on the intended application of the multiport waveguide device 10 and/or intended frequency of the RF signals. More specifically, the size, shape and position of the bent sections 44 and the band pass filter section 46 can vary with different embodiments depending on the intended application of the multiport waveguide device 10 and/or intended frequency of the RF signals.

In the illustrated embodiment, the second receiving port structure 14 includes a second receiving port 50 and a second receiving channel 52. The second receiving port 50 is placed adjacent to (e.g., against) the circuit board 30 at the second receiving portion 31b. The second receiving port 50 includes an aperture allowing transmission of the second RF signal to the circuit board 30 at the second receiving portion 31b. The second incoming RF signal is polarized in the first plane when transmitted through the second receiving port 50 to the second receiving portion 31b. Here, the second receiving port 50 is a vertical port. The second receiving port 50 can be, for example, a WR42 17.3-21.2 GHz port. The second receiving channel 52 places the second receiving port 50 in signal communication with the common port structure 20, thus guiding the second incoming RF signal from the common port structure 20 to the second receiving port 50. The second receiving channel 52 includes one or more bent sections 54 and a band pass filter section 56. The bent sections 54 allow the second receiving port 14 to curve around and be placed at an advantageous position on the circuit board 30 (here, in the fourth quadrant IV). The band pass filter section 56 ensures that the second incoming RF signal has a desired frequency. The band pass filter section 56 is sized and shaped to allow RF signals at some frequencies to pass, while rejecting RF signals at other frequencies. The size, shape and position of the second receiving port 50 and the second receiving channel 52 can vary with different embodiments depending on the intended application of the multiport waveguide device 10 and/or intended frequency of the RF signals. More specifically, the size, shape and position of the bent sections 54 and the band pass filter section 56 can vary with different embodiments depending on the intended application of the multiport waveguide device 10 and/or intended frequency of the RF signals.

The second receiving port structure 14 includes a polarization conversion section 58. The second receiving channel 52 can include or be attached to the polarization conversion section 58. The polarization conversion section 58 is configured with structure to convert the polarization of the second incoming RF signal from one plane to another plane (e.g., from a first plane to a second plane, or vice versa). For example, the polarization conversion section 58 can convert a horizontal RF signal to a vertical RF signal, or vice versa. Likewise, the polarization conversion section 58 can convert an E-plane signal to an H-plane signal, or vice versa. As described above, the second incoming RF signal is polarized in the second plane when transmitted to the second receiving port structure 14 from the common port structure 20. The polarization conversion section 58 changes the polarization of the second incoming RF signal to the first plane for transmission to the circuit board 30 at the second receiving port 50. Thus, the polarization conversion section 58 is configured to change a polarization of the second incoming RF signal to a different plane before the second incoming RF signal is transmitted to the circuit board 30 at the second receiving port 50. In the illustrated embodiment, an incoming RF signal polarized in the horizontal or E-plane from the common port structure 20 is converted by the polarization conversion section 58 to a vertical or H-plane signal before transmission to the circuit board 30 at the second receiving port 50. The polarization conversion section 58 can be formed integrally with the rest of the second receiving channel 52 or can be attached as a separate part.

In the illustrated embodiment, the first transmitting port structure 16 includes a first transmitting port 60 and a first transmitting channel 62. The first transmitting port 60 is placed adjacent to (e.g., against) the circuit board 30 at the first transmitting portion 31c. The first transmitting port 60 includes an aperture allowing reception of a first outgoing RF signal launched from the circuit board 30 at the first transmitting portion 31c. The first outgoing RF signal is polarized in the first plane when launched into the first transmitting port 60 from the first transmitting portion 31c. Here, the first transmitting port 60 is a vertical port. The first transmitting port 60 can be, for example, a WR28 28.3-30.5 GHz port. The first transmitting channel 62 places the first transmitting port 60 in signal communication with the common port structure 20, thus guiding the first outgoing RF signal from the first transmitting port 60 to the common port structure 20. The first transmitting channel 62 includes one or more bent sections 64. The bent sections 64 allow the first transmitting port structure 16 to curve around and be placed at an advantageous position on the circuit board 30 (here, in the first quadrant I). The size, shape and position of the first transmitting port 60 and the first transmitting channel 62 can vary with different embodiments depending on the intended application of the multiport waveguide device 10 and/or intended frequency of the RF signals.

In the illustrated embodiment, the second transmitting port structure 18 includes a second transmitting port 70 and a second transmitting channel 72. The second transmitting port 70 is placed adjacent to (e.g., against) the circuit board 30 at the second transmitting portion 31d. The second transmitting port 70 includes an aperture allowing reception of a second outgoing RF signal from the circuit board 30 at the second transmitting portion 31d. The second outgoing RF signal is polarized in the first plane when launched into the second transmitting port 70 from the second transmitting portion 31d. Here, the second transmitting port 70 is a vertical port. The second transmitting port 70 can be, for example, a WR28 28.3-30.5 GHz port. The second transmitting channel 72 places the second transmitting port 70 in signal communication with the common port structure 20, thus guiding a second outgoing RF signal from the second transmitting port 70 to the common port structure 20. The second transmitting channel 72 includes one or more bent sections 74. The bent sections 74 allow the first transmitting port structure 16 to curve around and be placed at an advantageous position on the circuit board 30 (here, in the first quadrant I). The size, shape and position of the second transmitting port 70 and the second transmitting channel 72 can vary with different embodiments depending on the intended application of the multiport waveguide device 10 and/or intended frequency of the RF signals.

The second transmitting port structure 18 includes a polarization conversion section 78. The second transmitting channel 72 can include or be attached to the polarization conversion section 78. The polarization conversion section 78 is configured with structure to convert the polarization of the second outgoing RF signal from one plane to another plane (e.g., from a first plane to a second plane, or vice versa). For example, the polarization conversion section 78 can convert a horizontal RF signal to a vertical RF signal, or vice versa. Likewise, the polarization conversion section 58 can convert an E-plane signal to an H-plane signal, or vice versa. As described above, the second outgoing RF signal is polarized in the first plane when launched from the circuit board 30 to the second receiving port structure 14. The polarization conversion section 78 changes the polarization of the second outgoing RF signal to the second plane for transmission to the common port structure 20. Thus, the polarization conversion section 78 is configured to change a polarization of the second outgoing RF signal to a different plane before the second outgoing RF signal is transmitted to the common port 20. In the illustrated embodiment, an outgoing RF signal polarized in the vertical or H-plane from the circuit board 30 is converted to a horizontal or E-plane signal before transmission to the common port structure 20. The polarization conversion section 78 can be formed integrally with the rest of the second transmitting channel 72 or can be attached as a separate part In the illustrated embodiment, the common port structure 20 includes a common channel 80 and a common port 82. The common port 82 includes an aperture allowing both the reception and transmission of RF signals. Here, the common port 82 is a square port which can guide RF signals in different planes (e.g., the first plane and/or the second plane). The common channel 80 places the common port 82 in signal communication with each of the first receiving port 40, the second receiving port 50, the first transmitting port 60, and the second transmitting port 70. The common port structure 20 is configured to guide the first incoming RF signal, the second incoming RF signal, the first outgoing RF signal, and the second outgoing RF signal through the common port 80. More specifically, the common port structure 20 is configured to simultaneously guide the first incoming RF signal, the second incoming RF signal, the first outgoing RF signal, and the second outgoing RF signal through the common port 80. Here, the common channel 80 tapers inwardly from the common port 82 in the x direction. The diplexer 36 and/or the OMT 38 can be attached to, placed within, and/or placed in signal communication with the common channel 80.

Figure 6:
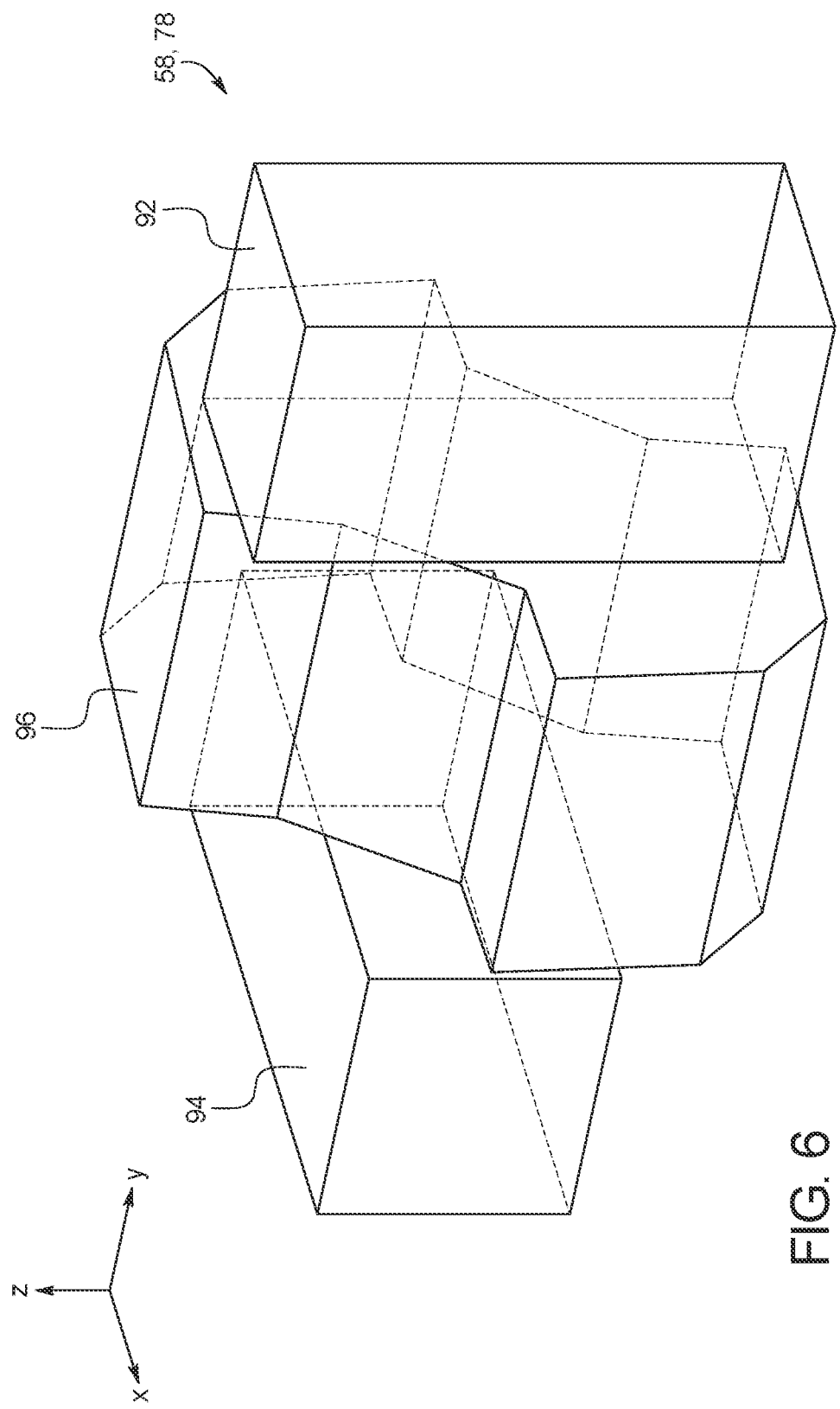
FIG. 6 illustrates an example embodiment of the polarization conversion section illustrated in FIGS. 4 and 5.

FIG. 6 illustrates the polarization conversion section 58 and/or the polarization conversion section 78 in more detail. As illustrated, a polarization conversion section 58, 78 includes an input channel 92, an output channel 94, and a plane conversion channel 96. In use, an RF signal is polarized in one plane (e.g., one of the first plane or the second plane) when it enters the input channel 92. The plane conversion channel 96 then changes the polarization of the RF signal to another plane (e.g., the other of the first plane or the second plane), and the RF signal exits the output channel 94 in the other plane (e.g., the other of the first plane or the second plane). As described above, the first and second planes are different planes. The first plane can be one of a horizontal plane and a vertical plane, and the second plane can be the other of the horizontal plane and the vertical plane. The first plane can be one of an E-plane and an H-plane, and the second plane can be the other of the E-plane and the H-plane. In the illustrated embodiment, the plane conversion channel 96 is sized, shaped and dimensioned to orthogonally change the polarization of an RF signal. It should be understood from this disclosure that the precise size, shape and dimensions of the elements of the plane conversion sections 58, 78 will vary depending, for example, on the intended frequency of the RF signals passing therethrough.

The illustrated multiport waveguide device 10 is configured to receive two incoming RF signals simultaneous by changing the polarization of one of the incoming RF signals to a different plane as discussed herein. The illustrated multiport waveguide device 10 is also configured to transmit two outgoing RF signals simultaneous by changing the polarization of one of the outgoing RF signals to a different plane as discussed herein. The illustrated multiport waveguide device 10 is configured to receive two incoming RF signals and transmit two outgoing RF signals, all simultaneously, without requiring electromechanical switching.

In use, the first incoming RF signal is received at the common port 82. In the illustrated embodiment, the first incoming RF signal is polarized as a vertical or H-plane RF signal at the common port 82. The first incoming RF signal is guided to the first receiving port 40 and transmitted to the circuit board 30 as a vertical or H-plane signal. The second incoming RF signal is also received at the common port 82. In the illustrated embodiment, the second incoming RF signal is polarized as a horizontal or E-plane RF signal at the common port 82. The second incoming RF signal is orthogonally changed to a vertical or H-plane signal at the polarization conversion section 58 and is guided to the second receiving port 50 and transmitted to the circuit board 30 as a vertical or H-plane signal. The first outgoing RF signal is launched by the circuit board 30. In the illustrated embodiment, the first outgoing RF signal is polarized as a vertical or H-plane RF signal when launched by the circuit board 30. The first outgoing RF signal is guided to the common port structure 20 and transmitted from the common port 82 as a vertical or H-plane signal. The second outgoing RF signal is also launched by the circuit board 30. In the illustrated embodiment, the second outgoing RF signal is polarized as a vertical or H-plane RF signal when launched by the circuit board 30. The second outgoing RF signal is orthogonally changed to a horizontal or E-plane signal at the polarization conversion section 78 and is guided to the common port structure 20 and transmitted from the common port 82 as a horizontal or E-plane signal. It should be understood from this disclosure that the horizontal and vertical or E-plane and H-plane terms in this example can be reversed.

Thus, the first incoming RF signal, the second incoming RF signal, the first outgoing RF signal and the second outgoing RF signal have a same polarization when received or launched by the circuit board 30. The same polarization can be one of a horizontal and vertical polarization, and the second incoming RF signal and the second outgoing RF signal can have a polarization of the other of the horizontal and vertical polarization when guided through the common port structure. The polarization of the first incoming RF signal is orthogonal to a polarization of the second incoming RF signal at the common port structure 20. The polarization of the first outgoing RF signal is orthogonal to a polarization of the second outgoing RF signal at the common port structure 20.

Thus, in the illustrated embodiment, the common port structure 20 can guide four simultaneous RF signals: a horizontal or E-plane incoming RF signal, a vertical or H-plane incoming RF signal, a horizontal or E-plane outgoing RF signal, and a vertical or H-plane outgoing RF signal. One or more of the RF signals can have the same frequency.

Construction of the multiport waveguide device 10 can be simple using relatively few parts. The first portion 22 and the second portion 24 can be formed as separate parts, for example, using split metal die casting methods. For example, the first portion 22 and the second portion 24 can be formed by zinc die casting. As shown in FIG. 4, the first portion 22 and the second portion 24 can each include portions of the first receiving port structure 12, the second receiving port structure 14, the first transmitting port structure 16, the second transmitting port structure 18, and/or the common port structure 20. As shown, the first portion 22 and the second portion 24 are split in the horizontal x-y plane. Thus, when the first portion 22 is attached to (e.g., sealed against) the second portion 24, the various channels 42, 52, 62, 72, 80 discussed herein are formed. More specifically, the various channels 42, 52, 62, 72, 80 are enclosed by the first portion 22 and the second portion 24, with the first portion 22 and the second portion 24 each forming a portion of each of the channels 42, 52, 62, 72, 80. When constructed as shown, the first receiving port 40, the second receiving port 50, the first transmitting port 60, and the second transmitting port 70 all protrude from one of the first portion 22 or the second portion 24 for attachment to a single circuit board 30. As shown, the first receiving port 40, the second receiving port 50, the first transmitting port 60, and the second transmitting port 70 all protrude orthogonally to the circuit plane of the circuit board 30.

The first portion 22 and the second portion 24 can be attached, for example, by injecting the third portion 26 (e.g., as metal or plastic) onto the first portion 22 and the second portion 24 once the first portion 22 and the second portion 24 have been aligned using the alignment feature 39. As illustrated in FIG. 1, the third portion 26 can be injected in one or more separate locations. Thus, the multiport waveguide device 10 can be formed by split metal diecasting the first portion 22 and the second portion 24 and then going through an injection metal assembly or plastic injecting molding process with the third portion 26 (e.g., which can requires a post metallization process). The circuit board 30 can then be screwed into the multiport waveguide device 10 using one or more fixing apparatuses 38.

Since the multiport waveguide device 10 can be inexpensively constructed, the multiport waveguide device 10 is useful for a variety of applications. The multiport waveguide device 10 can be used in applications that require all four transmitting/receiving ports. The multiport waveguide device 10 can also be used in applications that do not require all four transmitting/receiving ports. Thus, the multiport waveguide device 10 can be used in an application that requires one, two, three or four ports. Since the multiport waveguide device 10 is a compact device, higher data downloads and uploads are enabled.

Thus, in an embodiment, the multiport waveguide device 10 can include a first port structure having a first port and a second port structure having a second port. The first and second ports can interface with a circuit board 30. The first port structure can be one of the first receiving port structure 12 as described herein and the first transmitting port structure 16 as described herein. The second port structure can be one of the second receiving port structure 14 as described herein and the second transmitting port structure 18 as described herein. The multiport waveguide device 10 can also include a common port structure 20 including a common port 80, the common port 80 configured to simultaneously guide a first RF signal and a second RF signal. The first RF signal can be a first incoming RF signal as described herein or a first outgoing RF signal as described herein. The second RF signal can be a second incoming RF signal as described herein or a second outgoing RF signal as described herein. As described herein, the first port structure is configured to at least one of: (i) transmit the first RF signal polarized in a first plane from the first port to a circuit board, or (ii) receive the first RF signal polarized in the first plane from the circuit board into the first port. As described herein, the second port structure is configured to at least one of: (i) change the second RF signal from being polarized in a second plane to being polarized in the first plane before transmitting the second RF signal from the second port to the circuit board, or (ii) change the second RF signal from being polarized in the first plane to being polarized in the second plane after receiving the second RF signal from the circuit board into the second port.

In an embodiment, the first port structure is a first receiving port structure 12 as described herein, the first port is a first receiving port 40 as described herein, the first RF signal is a first incoming RF signal as described herein, and the first receiving port structure 12 is configured to transmit the first incoming RF signal polarized in the first plane from the first receiving port 40 to the circuit board 30.

In an embodiment, the second port structure is a second receiving port structure 14 as described herein, the second port is a second receiving port 50 as described herein, the second RF signal is a second incoming RF signal as described herein, and the second receiving port structure 14 is configured to change the second incoming RF signal from being polarized in the second plane to being polarized in the first plane before transmitting the second incoming RF signal from the second receiving port 50 to the circuit board 30.

In an embodiment, the first port structure is a first transmitting port structure 16 as described herein, the first port is a first transmitting port 60 as described herein, the first RF signal is a first outgoing RF signal as described herein, and the first transmitting port structure 16 is configured to receive the first outgoing RF signal polarized in the first plane from the circuit board 30 into the first transmitting port 60.

In an embodiment, the second port structure is a second transmitting port structure 18 as described herein, the second port is a second receiving port 70 as described herein, the second RF signal is a second outgoing RF signal as described herein, and the second receiving port structure 14 is configured to change the second outgoing RF signal from being polarized in the first plane to being polarized in the second plane after receiving the second outgoing RF signal from the circuit board 30 into the second transmitting port 70.

The multiport waveguide device 10 described herein has a compact design, is simple and inexpensive to construct, achieves high tolerances, does not require electromechanical switching, and allows a single circuit board to be used for all of the receiving and transmitting ports. It should be understood that various changes and modifications to the systems and methods described herein will be apparent to those skilled in the art and can be made without diminishing the intended advantages.

The embodiments described herein can be employed in, for example, the Jupiter 3 satellite system deployed by Hughes Network Systems or other type of 5G mm or sub mm wave radio equipment as understood in the art. The embodiments can be used for ka band applications or Q band applications, or other suitable mm wave or sub mm wave frequencies.

GENERAL INTERPRETATION OF TERMS

In understanding the scope of the present invention, the term "comprising" and its derivatives, as used herein, are intended to be open ended terms that specify the presence of the stated features, elements, components, groups, and/or steps, but do not exclude the presence of other unstated features, elements, components, groups, integers and/or steps. The foregoing also applies to words having similar meanings such as the terms, "including", "having" and their derivatives. Also, the terms "part," "section," or "element" when used in the singular can have the dual meaning of a single part or a plurality of parts.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A multiport waveguide device comprising:
   a first receiving port structure including a first receiving port configured to be placed adjacent to a circuit board, the first receiving port structure configured to guide a first incoming RF signal to the circuit board;
   a second receiving port structure including a second receiving port configured to be placed adjacent to the circuit board, the second receiving port structure configured to guide a second incoming RF signal to the circuit board;
   a first transmitting port structure including a first transmitting port configured to be placed adjacent to the circuit board, the first transmitting port structure configured to guide a first outgoing RF signal transmitted from the circuit board;
   a second transmitting port structure including a second transmitting port configured to be placed adjacent to the circuit board, the second transmitting port structure configured to guide a second outgoing RF signal transmitted from the circuit board; and
   a common port structure including a common port that is in signal communication with each of the first receiving port, the second receiving port, the first transmitting port, and the second transmitting port, the common port structure configured to simultaneously guide the first incoming RF signal, the second incoming RF signal, the first outgoing RF signal, and the second outgoing RF signal through the common port,
   the first incoming RF signal, the second incoming RF signal, the first outgoing RF signal and the second outgoing RF signal having a same polarization when received or launched by the circuit board.

2. A multiport waveguide device comprising:
   a first receiving port structure including a first receiving port configured to be placed adjacent to a circuit board, the first receiving port structure configured to guide a first incoming RF signal to the circuit board;
   a second receiving port structure including a second receiving port configured to be placed adjacent to the circuit board, the second receiving ort structure configured to guide a second incoming RF signal to the circuit board, the second receiving port structure including a polarization conversion section configured to change a polarization of the second incoming RF signal to a different plane before the second incoming RF signal is transmitted to the circuit board at the second receiving port;
   a first transmitting port structure including a first transmitting port configured to be placed adjacent to the circuit board, the first transmitting port structure configured to guide a first outgoing RF signal transmitted from the circuit board;
   a second transmitting port structure including a second transmitting port configured to be placed adjacent to the circuit board, the second transmitting port structure configured to guide a second outgoing RF signal transmitted from the circuit board; and
   a common port structure including a common port that is in signal communication with each of the first receiving port the second receiving port the first transmitting port, and the second transmitting port, the common port structure configured to simultaneously guide the first incoming RF signal, the second incoming RF signal, the first outgoing RF signal, and the second outgoing RF signal through the common port.

3. A multiport waveguide device comprising:
   a first receiving port structure including a first receiving port configured to be placed adjacent to a circuit board, the first receiving port structure configured to guide a first incoming RF signal to the circuit board;
   a second receiving port structure including a second receiving port configured to be placed adjacent to the circuit board, the second receiving port structure configured to guide a second incoming RF signal to the circuit board;
   a first transmitting port structure including a first transmitting port configured to be placed adjacent to the circuit board, the first transmitting port structure configured to guide a first outgoing RF signal transmitted from the circuit board;
   a second transmitting port structure including a second transmitting port configured to be placed adjacent to the circuit board, the second transmitting ort structure configured to guide a second outgoing RF signal transmitted from the circuit board; and
   a common port structure including a common port that is in signal communication with each of the first receiving port, the second receiving ort, the first transmitting port, and the second transmitting ort, the common port structure configured to simultaneously guide the first incoming RF signal, the second incoming RF signal, the first outgoing RF signal, and the second outgoing RF signal through the common port,
   the second transmitting port structure including a polarization conversion section configured to change a polarization of the second outgoing RF signal to a different plane before the second outgoing RF signal is transmitted to the common port.

4. The device of claim 1, wherein
   the same polarization is one of a horizontal and vertical polarization, and
   the second incoming RF signal and the second outgoing RF signal have a polarization of the other of the horizontal and vertical polarization when guided through the common port structure.

5. The device of claim 1, wherein
   a polarization of the first incoming RF signal is orthogonal to a polarization of the second incoming RF signal at the common port structure, and
   a polarization of the first outgoing RF signal is orthogonal to a polarization of the second outgoing RF signal at the common port structure.

6. The device of claim 1, further comprising
   a diplexer configured to implement frequency-domain multiplexing with respect to the first receiving port structure and the first transmitting port structure.

7. A terminal including the circuit board and the multiport waveguide device of claim 1.

8. A method of manufacturing the multiport waveguide device of claim 1, the method comprising:
   creating a first part including at least a first portion of each of the first receiving port structure, the second receiving port structure, the first transmitting port structure, the second transmitting port structure, and the common port structure;
   creating a second part including at least a second portion of each of the first receiving port structure, the second receiving port structure, the first transmitting port structure, the second transmitting port structure, and the common port structure; and attaching the first part to the second part to form a first receiving channel within the first receiving port structure, a second receiving channel within the second receiving port structure, a first transmitting channel within the first transmitting port structure, a second transmitting channel within the second transmitting port structure, and a common channel within the common port structure.

9. A multiport waveguide device comprising:
a first receiving port structure including a first receiving port, the first receiving port structure configured to transmit a first incoming RF signal polarized in a first plane from the first receiving port to a circuit board;
a second receiving port structure including a second receiving port, the second receiving port structure configured to change a second incoming RF signal from being polarized in a second plane to being polarized in the first plane before transmitting the second incoming RF signal from the second receiving port to the circuit board;
a first transmitting port structure including a first transmitting port, the first transmitting port structure configured to receive a first outgoing RF signal polarized in the first plane from the circuit board into the first transmitting port; and
a second transmitting port structure including a second transmitting port, the second transmitting port structure configured to change a second outgoing RF signal from being polarized in the first plane to being polarized in the second plane after receiving the second outgoing RF signal from the circuit board into the second receiving port; and
a common port structure including a common port that is in signal communication with each of the first receiving port, the second receiving port, the first transmitting port, and the second transmitting port, the common port structure configured to guide the first incoming RF signal, the second incoming RF signal, the first outgoing RF signal, and the second outgoing RF signal through the common port.

10. The device of claim 9, further comprising
a diplexer configured to implement frequency-domain multiplexing with respect to the first receiving port structure and the first transmitting port structure.

11. The device of claim 9, wherein
the common port structure is configured to simultaneously guide the first incoming RF signal, the second incoming RF signal, the first outgoing RF signal, and the second outgoing RF signal through the common port.

12. The device of claim 9, wherein
the first plane is orthogonal to the second plane.

13. The device of claim 9, wherein
the first plane is one of an E-plane and an H-plane, and the second plane is the other of the E-plane and the H-plane.

14. A terminal including the circuit board and the multiport waveguide device of claim 9.

15. A method of manufacturing the multiport waveguide device of claim 9, the method comprising:
creating a first part including at least a first portion of each of the first receiving port structure, the second receiving port structure, the first transmitting port structure, the second transmitting port structure, and the common port structure;

creating a second part including at least a second portion of each of the first receiving port structure, the second receiving port structure, the first transmitting port structure, the second transmitting port structure, and the common port structure; and attaching the first part to the second part to form a first receiving channel within the first receiving port structure, a second receiving channel within the second receiving port structure, a first transmitting channel within the first transmitting port structure, a second transmitting channel within the second transmitting port structure, and a common channel within the common port structure.

16. A multiport waveguide device comprising:
a first port structure including a first port, the first port configured to interface with a circuit board;
a second port structure including a second port, the second port configured to interface with the circuit board; and
a common port structure including a common port, the common port configured to simultaneously guide a first RF signal and a second RF signal;
the first port structure configured to at least one of: (i) transmit the first RF signal polarized in a first plane from the first port to the circuit board, or (ii) receive the first RF signal polarized in the first plane from the circuit board into the first port; and
the second port structure configured to at least one of: (i) change the second RF signal from being polarized in a second plane to being polarized in the first plane before transmitting the second RF signal from the second port to the circuit board, or (ii) change the second RF signal from being polarized in the first plane to being polarized in the second plane after receiving the second RF signal from the circuit board into the second port.

17. The device of claim 16, wherein
the first port structure is a first receiving port structure,
the first port is a first receiving port,
the first RF signal is a first incoming RF signal, and
the first receiving port structure is configured to transmit the first incoming RF signal polarized in the first plane from the first receiving port to the circuit board.

18. The device of claim 16, wherein
the second port structure is a second receiving port structure,
the second port is a second receiving port,
the second RF signal is a second incoming RF signal, and
the second receiving port structure is configured to change the second incoming RF signal from being polarized in the second plane to being polarized in the first plane before transmitting the second incoming RF signal from the second receiving port to the circuit board.

19. The device of claim 16, wherein
the first port structure is a first transmitting port structure,
the first port is a first transmitting port,
the first RF signal is a first outgoing RF signal, and
the first transmitting port structure is configured to receive the first outgoing RF signal polarized in the first plane from the circuit board into the first transmitting port.

20. The device of claim 16, wherein
the second port structure is a second transmitting port structure,
the second port is a second transmitting port,
the second RF signal is a second outgoing RF signal, and
the second transmitting port structure is configured to change the second outgoing RF signal from being polarized in the first plane to being polarized in the second plane after receiving the second outgoing RF signal from the circuit board into the second transmitting port.

* * * * *